US006968330B2

(12) United States Patent
Edwards et al.

(10) Patent No.: US 6,968,330 B2
(45) Date of Patent: Nov. 22, 2005

(54) DATABASE QUERY OPTIMIZATION APPARATUS AND METHOD

(75) Inventors: John Francis Edwards, Rochester, MN (US); Michael S. Faunce, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/012,278

(22) Filed: Nov. 29, 2001

(65) Prior Publication Data

US 2003/0100960 A1 May 29, 2003

(51) Int. Cl.[7] ............................................. G06F 17/30
(52) U.S. Cl. ............................. 707/2; 707/4; 707/102
(58) Field of Search ............................. 707/1, 2, 102, 707/4

(56) References Cited

U.S. PATENT DOCUMENTS

| | | | | |
|---|---|---|---|---|
| 5,091,852 | A * | 2/1992 | Tsuchida et al. | 707/2 |
| 5,930,785 | A * | 7/1999 | Lohman et al. | 707/2 |
| 6,381,616 | B1 * | 4/2002 | Larson et al. | 707/201 |
| 6,567,804 | B1 * | 5/2003 | Ramasamy et al. | 707/4 |
| 6,697,961 | B1 * | 2/2004 | Petrenko et al. | 714/26 |
| 6,721,724 | B1 * | 4/2004 | Galindo-Legaria et al. | 707/2 |
| 6,748,392 | B1 * | 6/2004 | Galindo-Legaria et al. | 707/102 |

OTHER PUBLICATIONS

Claussen, Jens, et al, Optimization and Evaluation of Disjunctive Queries, Knowledge and Data Engineering, IEEE Transactions on vol. 12, issue 2, Mar.-Apr. 2000 pp. 238-260.*

* cited by examiner

*Primary Examiner*—Luke S Wassum
*Assistant Examiner*—Susan Rayyan
(74) *Attorney, Agent, or Firm*—Martin & Associates, LLC; Derek P. Martin

(57) ABSTRACT

A database query optimizer processes an expression in a database query, and generates therefrom an operand list and a corresponding truth table that may be represented by a list of binary characters, where the operand list and corresponding truth table represent a disjunct normal form for the expression. Each expression is stored once it is processed into its operand list and corresponding list of binary characters. New queries are processed into component expressions, and each expression is checked to see if the expression was previously processed and stored as a processed expression. If so, the operand list and list of binary characters for the previously-stored expression may be used in processing the current expression. If there is no previously-stored expression that corresponds to the current expression, the previously-stored expressions are checked to see if any correspond to a complement of the current expression. If so, a new expression is easily constructed for the current expression by retrieving the list of binary characters that correspond to the complement expression, and inverting the bits in the list of binary characters. If there is no previously-stored expression that corresponds to the current expression or its complement, an operand list and corresponding list of binary characters are generated for the current expression. Logical operations between predicates in a query may be performed by performing mathematical operations on the lists of binary characters corresponding to each predicate expression. The end result is an operand list and corresponding list of binary characters that represents the entire expression in a query.

54 Claims, 19 Drawing Sheets

| Predicate Expression | | | |
|---|---|---|---|
| Logical Expression | Relational Expression | Unary Expression | Boolean Expression |
| AND<br>OR<br>NOT | <<br>><br><=<br>>=<br>=<br>!= | isNull<br>isNotNull<br>exist<br>NotExist | TRUE<br>FALSE |

FIG. 1

Select * from Table1 where C1=4 AND (C2>6 OR C3!=8)

FIG. 2

C1=4 AND (C2>6 OR C3!=8)

FIG. 3

C1=4 AND C2<=6 AND C3!=8
OR
C1=4 AND C2>6 AND C3=8
OR
C1=4 AND C2>6 AND C3!=8

720A

C1=4 // Dimension A
C2>6 // Dimension B
C3!=8 // Dimension C

730A

| A | B | C | T |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |
| 1 | 1 | 0 | 1 |
| 1 | 1 | 1 | 1 |

730B $T_{ABC}$:{1,1,1,0,0,0,0,0}

(C1=5 OR C2>6) AND C3=7

| A | B | A OR B |
|---|---|---|
| 0 | 0 | 0 |
| 0 | 1 | 1 |
| 1 | 0 | 1 |
| 1 | 1 | 1 |

where A // C1=5
and B // C2>6

| C | T |
|---|---|
| 0 | 0 |
| 1 | 1 |

where C // C3=7

FIG. 18

| ID | A | B | A OR B |
|---|---|---|---|
| AB[0] | 0 | 0 | 0 |
| AB[1] | 0 | 1 | 1 |
| AB[2] | 1 | 0 | 1 |
| AB[3] | 1 | 1 | 1 |

| ID | C |
|---|---|
| C[0] | 0 |
| C[1] | 1 |

| Tuple | After AND |
|---|---|
| (0,0) | 0 |
| (0,1) | 0 |
| (1,0) | 0 |
| (1,1) | 1 |
| (1,0) | 0 |
| (1,1) | 1 |
| (1,0) | 0 |
| (1,1) | 1 |

FIG. 21

| A | B | C | (A OR B) AND C |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |

AB X CD =
{{1 AND CD}, {1 AND CD}, {1 AND CD},{0 AND CD}}

```
{{1,0,0,0},    // results of {1 AND CD}
 {1,0,0,0},    // results of {1 AND CD}
 {1,0,0,0},    // results of {1 AND CD}
 {0,0,0,0}}    // results of {0 AND CD}
```

FIG. 26

$T_{ABCD}$: {1,0,0,0,1,0,0,0,1,0,0,0,0,0,0,0}

```
{{1,1,1,1},   // results of {1 OR CD}
 {1,1,1,1},   // results of {1 OR CD}
 {1,1,1,1},   // results of {1 OR CD}
 {1,0,0,0}}   // results of {0 OR CD}
```

$T_{ABCD}$: {1,1,1,1,1,1,1,1,1,1,1,1,1,0,0,0}

3200

| A | B | C | T |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |

3220 <==> is equivalent to

3210

| B | C | A | T |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

$$T_{ABC}: \{1,0,1,0,1,0,0,0\} = T_{BCA}: \{1,1,0,0,1,0,0,0\}$$

| ID | A | B | T |
|---|---|---|---|
| AB[0] | 0 | 0 | 0 |
| AB[1] | 0 | 0 | 1 |
| AB[2] | 1 | 0 | 1 |
| AB[3] | 1 | 1 | 1 |

3510

| ID | A | T |
|---|---|---|
| A[0] | 0 | 0 |
| A[1] | 1 | 1 |

| A | B | A | AB OR A | T | |
|---|---|---|---|---|---|
| 0 | 0 | 0 | AB[0] OR A[0] | 0 | |
| 0 | 0 | 1 | AB[0] OR A[1] | 1 | * |
| 0 | 1 | 0 | AB[1] OR A[0] | 1 | |
| 0 | 1 | 1 | AB[1] OR A[1] | 1 | * |
| 1 | 0 | 0 | AB[2] OR A[0] | 1 | * |
| 1 | 0 | 1 | AB[2] OR A[1] | 1 | |
| 1 | 1 | 0 | AB[3] OR A[0] | 1 | * |
| 1 | 1 | 1 | AB[3] OR A[1] | 1 | |

* absurd cases because A and ~A exist at the same time

| A | B | A | AB OR A | T |
|---|---|---|---|---|
| 0 | 0 | 0 | AB[0] OR A[0] | 0 |
| 0 | 1 | 0 | AB[1] OR A[0] | 1 |
| 1 | 0 | 1 | AB[2] OR A[1] | 1 |
| 1 | 1 | 1 | AB[3] OR A[1] | 1 |

| A | B | T |
|---|---|---|
| 0 | 0 | 0 |
| 0 | 1 | 1 |
| 1 | 0 | 1 |
| 1 | 1 | 1 |

(C1=5 OR C2>6) AND C1=5

| ID | A | B | T |
|---|---|---|---|
| AB[0] | 0 | 0 | 0 |
| AB[1] | 0 | 1 | 1 |
| AB[2] | 1 | 0 | 1 |
| AB[3] | 1 | 1 | 1 |

4210

| ID | A | T |
|---|---|---|
| A[0] | 0 | 0 |
| A[1] | 1 | 1 |

| A | B | A | AB AND A | T | |
|---|---|---|---|---|---|
| 0 | 0 | 0 | AB[0] AND A[0] | 0 | |
| 0 | 0 | 1 | AB[0] AND A[1] | 0 | * |
| 0 | 1 | 0 | AB[1] AND A[0] | 0 | |
| 0 | 1 | 1 | AB[1] AND A[1] | 1 | * |
| 1 | 0 | 0 | AB[2] AND A[0] | 0 | * |
| 1 | 0 | 1 | AB[2] AND A[1] | 1 | |
| 1 | 1 | 0 | AB[3] AND A[0] | 0 | * |
| 1 | 1 | 1 | AB[3] AND A[1] | 1 | |

* absurd cases because A and ~A exist at the same time

| A | B | A | AB AND A | T |
|---|---|---|---|---|
| 0 | 0 | 0 | AB[0] AND A[0] | 0 |
| 0 | 1 | 0 | AB[1] AND A[0] | 0 |
| 1 | 0 | 1 | AB[2] AND A[1] | 1 |
| 1 | 1 | 1 | AB[3] AND A[1] | 1 |

| A | B | T | |
|---|---|---|---|
| 0 | 0 | 0 | Equal - value of B does not matter |
| 0 | 1 | 0 | |
| 1 | 0 | 1 | Equal - value of B does not matter |
| 1 | 1 | 1 | |

| A | T |
|---|---|
| 0 | 0 |
| 1 | 1 |

| C | B | A | T | Region |
|---|---|---|---|---|
| 0 | 0 | 0 | 0 | 0 |
| 0 | 0 | 1 | 0 | 1 |
| 0 | 1 | 0 | 0 | 2 |
| 0 | 1 | 1 | 1 | 3 |
| 1 | 0 | 0 | 0 | 4 |
| 1 | 0 | 1 | 0 | 5 |
| 1 | 1 | 0 | 1 | 6 |
| 1 | 1 | 1 | 1 | 7 |

DATABASE QUERY OPTIMIZATION APPARATUS AND METHOD

BACKGROUND OF THE INVENTION

1. Technical Field

This invention generally relates to computer systems, and more specifically relates to apparatus and methods for accessing data in a computer database.

2. Background Art

Since the dawn of the computer age, computers have evolved and become more and more powerful. In our present day, computers have become indispensable in many fields of human endeavor including engineering design, machine and process control, and information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A database query typically includes one or more predicate expressions interconnected with logical operators. A predicate expression is a general term given to one of the following four kinds of expressions (or their combinations): logical, relational, unary, and boolean, as shown in FIG. 1. A query usually specifies conditions that apply to one or more columns of the database, and may specify relatively complex logical operations on multiple columns. The database is searched for records that satisfy the query, and those records are returned as the query result.

One problem with known database systems is the evaluation of complex expressions that may be present in a query. In the prior art, each time a query is presented, each predicate expression in the query typically must be evaluated to generate the overall expression in the query. Without an apparatus and method for evaluating a query based on predicate expressions in the query that may have been previously processed and stored, the computer industry will continue to suffer from excessive overhead in processing database queries.

DISCLOSURE OF INVENTION

According to the preferred embodiments, a database query optimizer processes an expression in a database query, and generates therefrom an operand list and a corresponding truth table that may be represented by a list of binary characters, where the operand list and corresponding truth table represent a disjunct normal form for the expression. Each expression is stored once it is processed into its operand list and corresponding list of binary characters. New queries are processed into component expressions, and each expression is checked to see if the expression was previously processed and stored as a processed expression. If so, the operand list and list of binary characters for the previously-stored expression may be used in processing the current expression. If there is no previously-stored expression that corresponds to the current expression, the previously-stored expressions are checked to see if any correspond to a complement of the current expression. If so, a new expression is easily constructed for the current expression by retrieving the list of binary characters that correspond to the complement expression, and inverting the bits in the list of binary characters. If there is no previously-stored expression that corresponds to the current expression or its complement, an operand list and corresponding list of binary characters are generated for the current expression. Logical operations between predicates in a query may be performed by performing mathematical operations on the lists of binary characters corresponding to each predicate expression. The end result is an operand list and corresponding list of binary characters that represents the entire expression in a query.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 1 is a table showing expressions that may be included in a predicate expression in a database query;

FIG. 2 is a sample database query in Structured Query Language (SQL);

FIG. 3 is a predicate expression that is representative of the "where" clause in the sample database query of FIG. 2;

FIG. 16 is a logical expression that is representative of a predicate expression in a sample database query;

FIG. 17 is a truth table for the expression in the parentheses in FIG. 16;

FIG. 18 is a truth table for the expression C3=7 in FIG. 16;

FIG. 19 shows the truth tables in FIGS. 17 and 18 with assigned identifiers;

FIG. 20 shows the tuples that result from taking the cross product of AB and C;

FIG. 21 shows the tuples of FIG. 20 and the resulting values after applying the AND operator to the bits in the tuples;

FIG. 22 is a truth table showing the equivalence between the tuple values in FIG. 21 and the logical expression (A OR B) AND C;

FIG. 26 represents the results of applying the method of FIG. 25 to the cross product in FIG. 24;

FIG. 27 is a bit map that represents the results shown in FIG. 26;

FIG. 28 shows the cross product of AB and CD using the OR operator;

FIG. 32 is a diagram showing the result of taking a truth table and reordering its operands;

FIG. 33 is a diagram showing the equivalence of the operand lists and truth tables in FIG. 32;

FIG. 34 is a logical expression that is representative of a predicate expression in a sample database query that may result from performing logical operations on stored predicate expressions;

FIG. 35 shows the truth tables for stored expressions that correspond to the predicate expressions in FIG. 34;

FIG. 36 shows the bit maps that correspond to the truth tables of FIG. 35;

FIG. 37 shows the truth table that results from combining the truth tables of FIG. 35;

FIG. 38 shows the truth table of FIG. 37 after removing the rows that represent absurd cases;

FIG. 39 shows the truth table of FIG. 38 with the second redundant A dimension deleted;

FIG. 40 is a bit map that represents the truth table of FIG. 39;

FIG. 41 is a logical expression that is representative of a predicate expression in a sample database query;

FIG. 42 shows the truth tables for stored expressions that correspond to the predicate expressions in FIG. 41;

FIG. 43 shows the truth table that results from combining the truth tables of FIG. 42;

FIG. 44 shows the truth table of FIG. 43 after removing the rows that represent absurd cases;

FIG. 45 shows that the value of B does not matter for the truth table of FIG. 44;

FIG. 46 is the truth table of FIG. 45 after removing non-significant dimension B;

FIG. 47 is a bit map of the truth table of FIG. 46;

Figure 4:
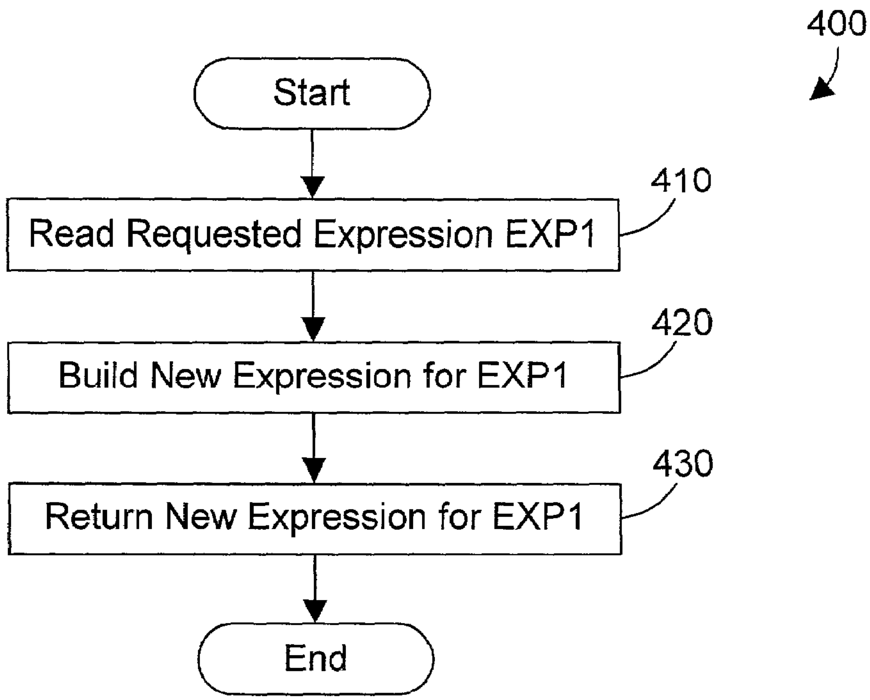
FIG. 4 is a flow diagram of a prior art method for building predicate expressions as a result of a database query.

BEST MODE FOR CARRYING OUT THE INVENTION 1.0 Overview

The present invention relates to optimizing database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. One sample SQL query is shown in FIG. 2. The "select*" statement tells the database query processor to select all columns, the "from Table1" statement identifies which database table to search, and the "where" clause specifies one or more expressions that must be satisfied for a record to be retrieved. Note that the query of FIG. 2 is expressed in terms of columns C1, C2 and C3. Information about the internal storage of the data is not required as long as the query is written in terms of expressions that relate to values in columns from tables.

For the query of FIG. 2, the "where" clause specifies that the first column has a value equal to four (C1=4) logically ANDed with the expression that the second column is greater than six OR the third column is not equal to eight. The value of the "where" clause contains predicate expressions that may be processed in accordance with the preferred embodiments. For this reason, the discussion herein, which emphasizes the processing of logical expressions, is understood to primarily relate to the processing of one or more clauses in a database query that may contain predicate expressions, such as the "where" clause of an SQL query. The expression in the "where" clause of FIG. 2 is shown in FIG. 3. Where not specifically stated herein, the term "expression" is intended to mean an arbitrary predicate expression, which can be an entire expression in a query or a portion of an expression in a query, and may include logical expressions, relational expressions, unary expressions, boolean expressions, and their combinations.

In the prior art, a tool known as a query optimizer must evaluate expressions in a query. When an expression becomes complex, the query optimizer often approaches the expression from multiple perspectives. In many cases, the optimizer will divide an expression into multiple sub-expressions. Although these sub-expression may take different forms, they may actually represent equivalent expressions, which are typically not detected by prior art query optimizers. One known way to process a query is shown by method 400 of FIG. 4. We assume that EXP1 represents a predicate expression within a query. First, the expression EXP1 is read from the query (step 410). The expression is then processed by building a new expression for EXP1 (step 420). The new expression for EXP1 is then returned (step 430).

Figure 5:
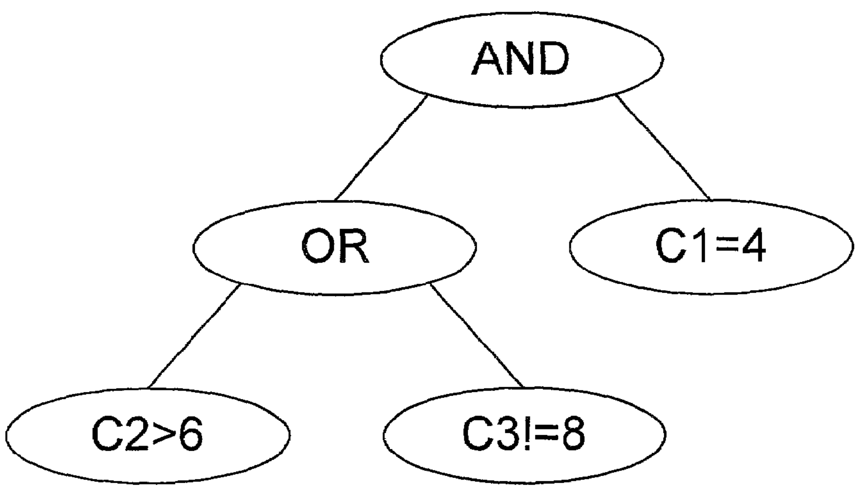
FIG. 5 is a tree diagram for the expression of FIG. 3 that is constructed in step 420 of FIG. 4.

One way that is known in the art to build an expression in step 420 is to build a tree of expressions, shown in FIG. 5. The tree of FIG. 5 shows the logical equivalent of the expression of FIG. 3. Building a tree, such as that in FIG. 5, for a complex logical expression results in a complex tree. As a result, the expression tree of FIG. 5 is not well-suited to comparison against other expressions. Note that each node in the expression tree of FIG. 5 is a predicate expression.

Using prior art method 400, each predicate expression in a query must be processed by the query optimizer and combined into an overall tree for the expression. As a result, there is no benefit that may be gained from having previously evaluated any predicate expression in the query. The preferred embodiments, in contrast, (discussed in detail below) provide an advance over the prior art shown in FIG. 4 by generating a unique representation of the disjunct normal form of an expression. This disjunct normal form can be used to find information already stored about some form of a predicate expression, and can be easily manipulated to represent combinations of predicate expressions.

2.0 Detailed Description

The preferred embodiments provide a way to store an expression in a compact and easily manipulated version of disjunct normal form so the expression need not be processed multiple times, and can be easily compared to previously-stored expressions. Each expression is stored as a list of operands and a corresponding list of binary characters that represent a truth table for the operands. The combination of the list of operands and the list of binary characters comprise a disjunct normal form for the expression. When a current expression needs to be processed, the stored expressions are first evaluated to see if the expression has previously been processed. If so, the stored expression corresponding to the expression is returned. If not, the stored expressions are analyzed to see if the complement of the current expression exists. If the complement is stored, it can be easily changed to the current expression by inverting the bits in the list of binary characters corresponding to the complement. If neither the current expression nor its complement are stored, the current expression is processed to generate the list of operands and corresponding list of binary characters, and is stored for future use, if needed. In this manner the effort to process an expression is only performed if the expression or its complement have never been processed before.

Figure 6:
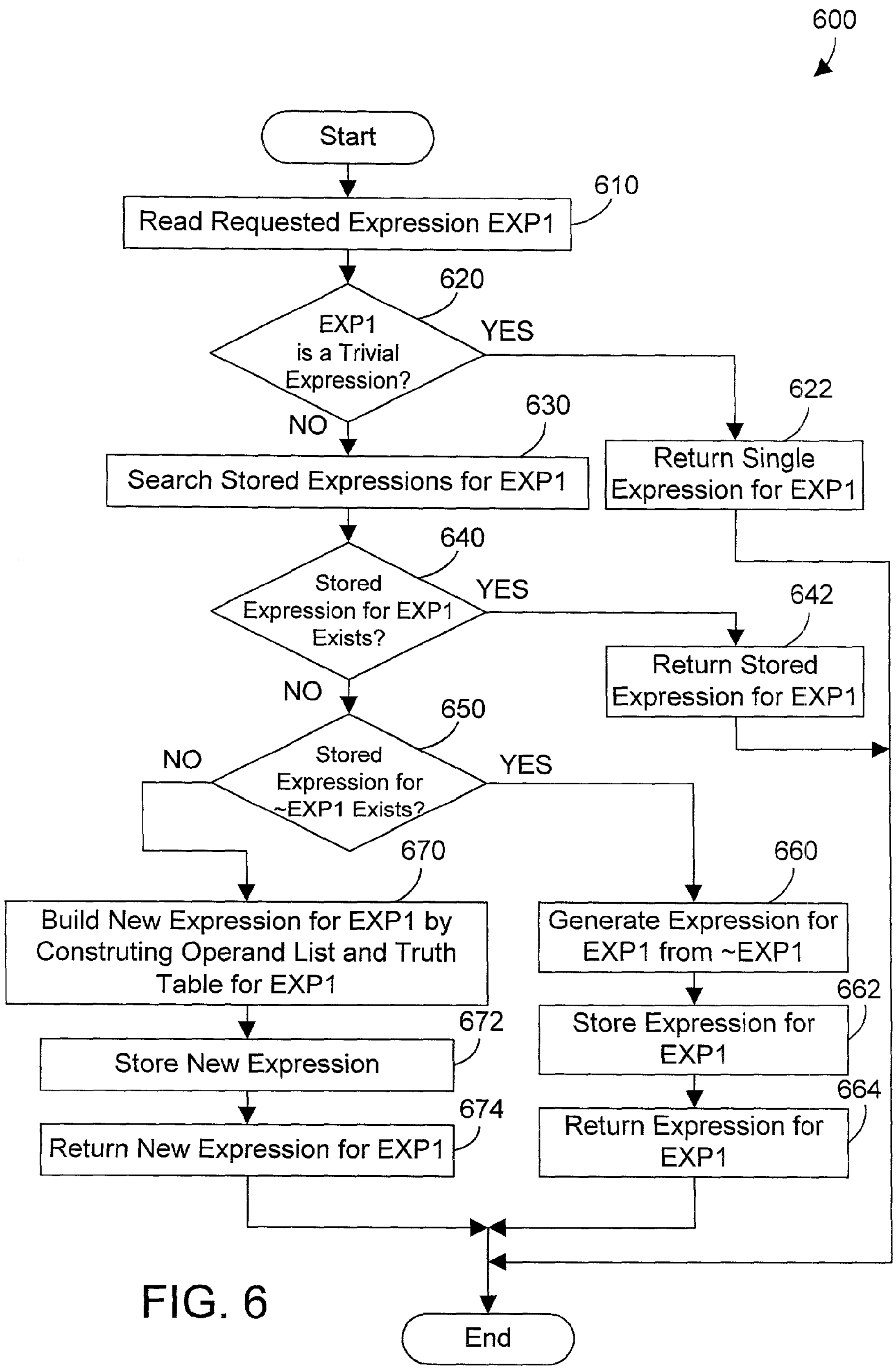
FIG. 6 is a flow diagram of a method for returning an expression as a result of a database query according to the preferred embodiments.

Referring now to FIG. 6, a method 600 for evaluating a predicate expression in accordance with the preferred embodiments begins by reading an expression denoted EXP1 (step 610). Note that step 610 could be performed as part of the processing of a database query. EXP1 is analyzed to determine if EXP1 is a trivial predicate expression (step 620). In this context, a predicate expression is trivial if it can be reduced to a single relational, unary, or boolean expression. If EXP1 is trivial (step 620=YES), the equivalent relational, unary, or boolean expression for EXP1 is returned (step 622). If EXP1 is not trivial (step 620=NO), the stored expressions are searched to see if there is a stored expression that corresponds to EXP1 (step 630). If there is a stored expression for EXP1 (step 640=YES), the stored expression for EXP1 is returned (step 642). If there is no stored expression for EXP1 (step 640=NO), method 600 next checks to see if there is a stored expression for the complement of EXP1, denoted ~EXP1 (step 650). If a stored expression corresponds to the complement of EXP1 (step 650=YES), the expression for EXP1 is generated from the operand list and list of binary characters for ~EXP1 (step 660). The generation of the expression for EXP1 from the expression 18 EXP1 in step 660 is very simple. The operand list for ~EXP1 is copied to the operand list for EXP1. Each bit in the list of binary characters for ~EXP1 is inverted, and the inverted values are stored as the list of binary characters for EXP1. This expression for EXP1 is then stored (step 662) and returned (step 664). If there is no stored expression for ~EXP1 (step 650=NO), a new expression for EXP1 is built by constructing an operand list and corresponding truth table (i.e., list of binary characters) for EXP1 (step 670). The new expression is stored (step 672) and returned (step 674). In this manner, method 600 stores each expression as it is processed so it can benefit from previous processing when it finds an expression or its complement that it has processed in the past.

Figures 7, 8, 9:
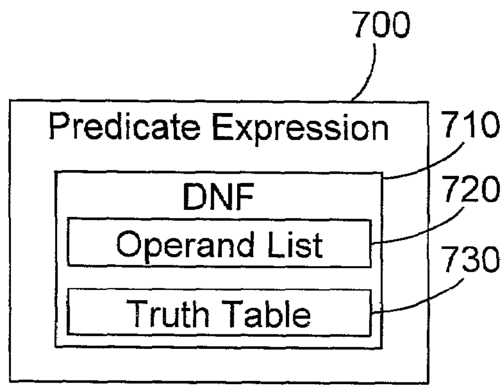
FIG. 7 is a block diagram of a predicate expression according to the preferred embodiments.
FIG. 8 is a disjunct normal form for the predicate expression in FIG. 3.
FIG. 9 shows the assignment of operands in the predicate expression of FIG. 3 to dimensions in a truth table according to the preferred embodiments.

FIG. 7 is a representation of a predicate expression 700 that may be stored for later use. Predicate expression 700 specifies a disjunct normal form 710 of an expression by providing an operand list 720 and a corresponding truth table 730 (preferably in the form of a list of binary characters) that corresponds to the operand list 720. In the preferred embodiments, the operand list is a list of operand addresses, which are preferably addresses of objects that specify relational, unary, or boolean expressions. If the operand list 720 contains N operand addresses, the list of binary characters corresponding to truth table 730 will contain $2^N$ characters. Note that the truth table 730 contains a number of dimensions that is equal to the number of operands in the operand list. This allows truth table 730 to be viewed as a cube with N dimensions.

Figure 13:
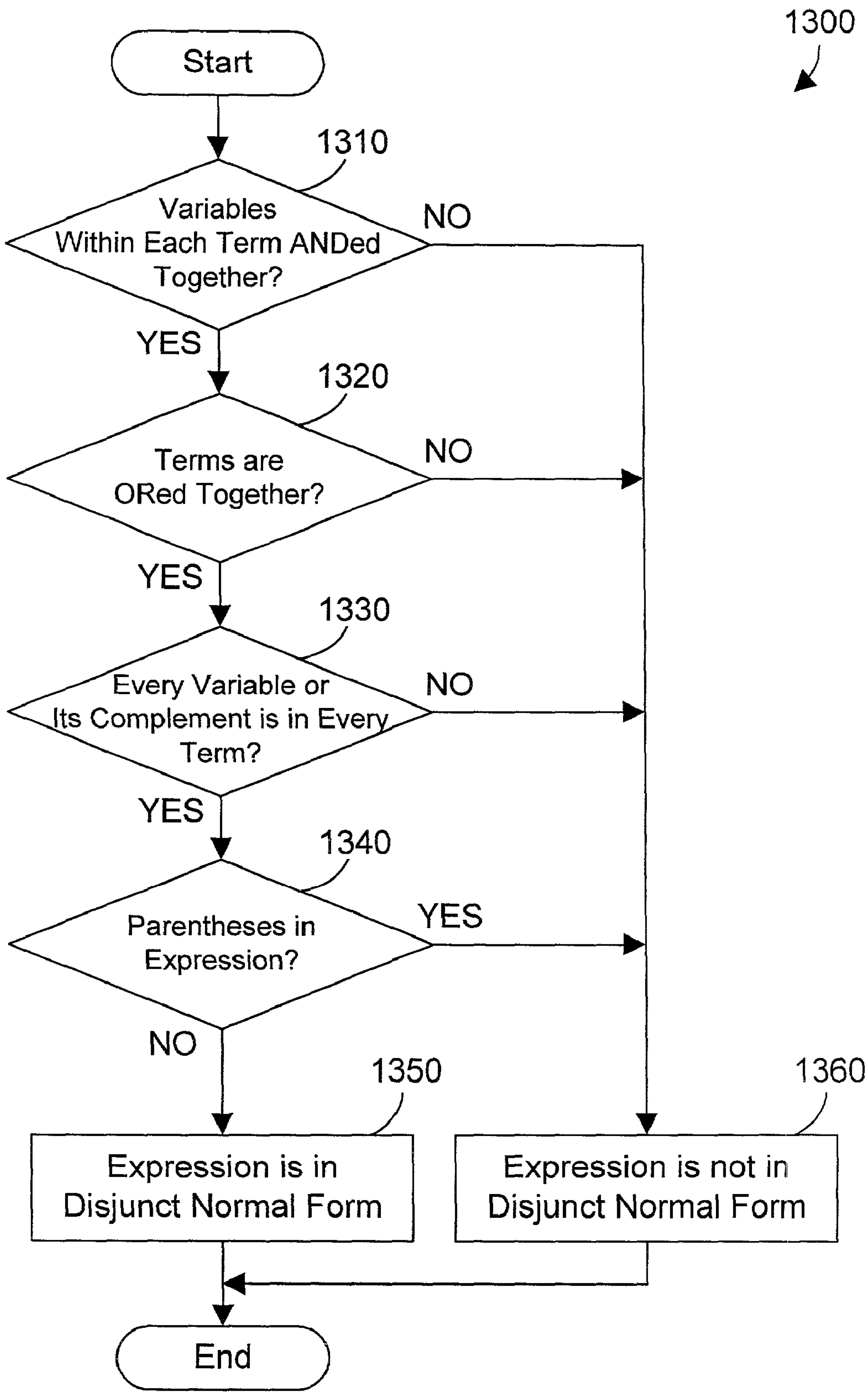
FIG. 13 is a flow diagram of a method for determining whether an expression is in disjunct normal form.

The predicate expression of FIG. 3 may be broken down into its disjunct normal form as shown in FIG. 8. The disjunct normal form of an expression is defined as shown in method 1300 of FIG. 13. If the variables within each term are ANDed together (step 1310=YES), and if the terms themselves are ORed together (step 1320=YES), and if every variable or its complement is in every term (step 1330=YES), and if there are no parentheses in the expression (step 1340=NO), then the expression is in disjunct normal form (step 1350). Otherwise, if one or more of these criteria in steps 1310–1340 are not satisfied, the expression is not in disjunct normal form (step 1360). In the expression of FIG. 8, each of the three terms is on a separate line. We see that the variables within each term are ANDed together (step 1310=YES), that the terms are ORed together (step 1320=YES), that every variable or its complement is in every term (step 1330=YES), that there are no parentheses in the expression (step 1340=NO), so the expression in FIG. 8 is a disjunct normal form for the expression of FIG. 3 (step 1360).

We now illustrate how the preferred embodiments represent the predicate expression of FIG. 3 into a unique representation of the disjunct normal form. First, each operand in the predicate expression is assigned to a different dimension in a truth table. As shown in FIG. 9, the C1=4 expression is arbitrarily selected as dimension A, the C2>6 expression is arbitrarily selected as dimension B, and the C3!=8 expression is arbitrarily selected as dimension C. The list 720A shown in FIG. 9 represents the operands for the expression in FIG. 3. In the preferred embodiments, each of these operands preferably correspond to an object with a defined address. The list of addresses corresponding to the operands shown in FIG. 9 are stored as the operand list (720 of FIG. 7) for the expression in FIG. 3. Thus, operand list 720A is symbolic of the operand list 720 that would be stored for the expression of FIG. 3.

Figures 10, 11, 12:
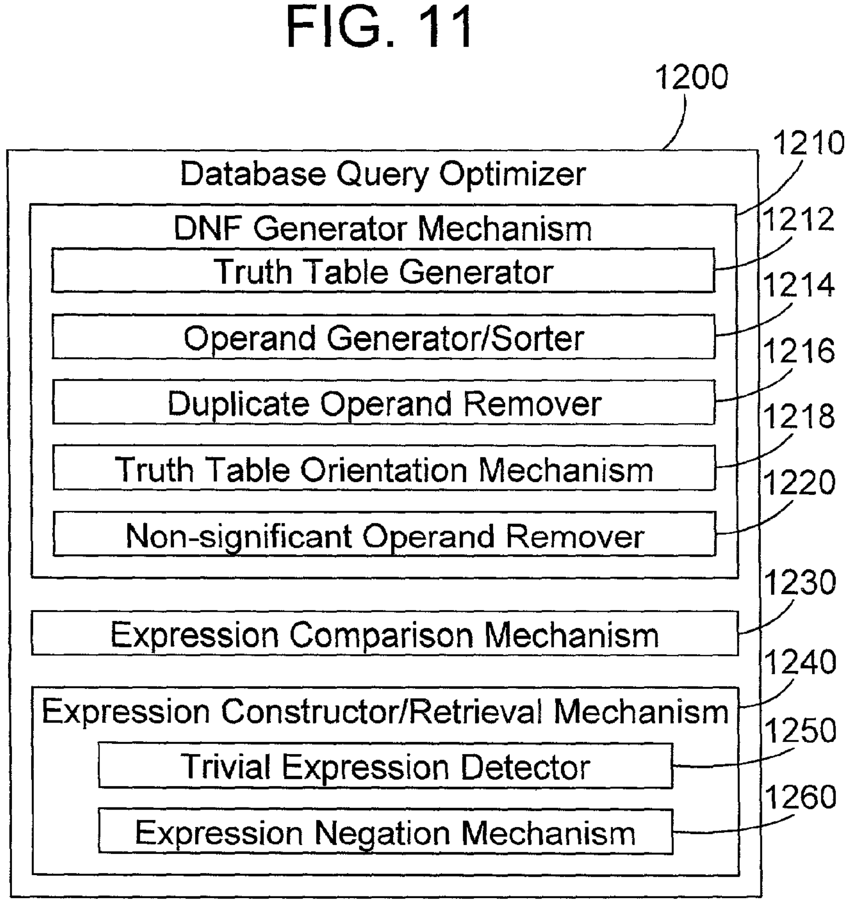
FIG. 10 is a truth table representative of the predicate expression of FIG. 3.
FIG. 11 is a list of binary characters (bit map) that summarizes the results in the truth table of FIG. 10.
FIG. 12 is a block diagram of a database query optimizer according to the preferred embodiments.

With the operand list 720A as shown in FIG. 9, we can generate a truth table 730A as shown in FIG. 10. The truth table 730A has the first operand in the list of operands 720A (FIG. 9) (corresponding to dimension A) in the most significant position, has the second operand in the list of operands 720A (corresponding to dimension B) in the next significant position, and has the third operand in the list of operands 720A (corresponding to dimension C) in the least significant position, as shown in FIG. 10. Note that the last three lines of the truth table correspond to the expressions in FIG. 8, showing that the truth table represents the expression of FIG. 3 in disjunct normal form.

Note that the truth table 730A of FIG. 10 can be summarized with a list of binary characters shown in FIG. 11, which includes a single binary digit (or bit) for each value in the truth table. While the truth table 730A of FIG. 10 is useful in determining visually the relationship between dimensions, the list of binary characters 730B shown in FIG. 11 is a summary of that same information. This list of binary characters shown in FIG. 11 is stored as the truth table (730 of FIG. 7) for the expression of FIG. 3. Thus, the operand list C1=4, C2>6, C3!=8 (shown in FIG. 9) and corresponding list of binary information 730B (shown in FIG. 11) represent the predicate expression shown in FIG. 3. With an expression represented by a list of operands and corresponding list of binary characters, we now determine how these values may be processed and manipulated to process expressions, such as those that may be found in a database query.

FIG. 12 is a block diagram that shows different functional elements of the database query optimizer 1200 in accordance with the preferred embodiments. The database query optimizer 1200 includes a DNF generator mechanism 1210 that generates a predicate expression 700 as shown in FIG. 7 by generating the operand list 720 and corresponding truth table 730 for the predicate expression. The DNF generator mechanism 1210 in FIG. 12 represents the mechanism of the preferred embodiments that generates the operand list and corresponding truth table. A truth table generator 1212 generates the list of binary characters that correspond to a particular operand list. An operand generator/sorter 1214 is used to generate the operand list 720 for an expression, and to sort the operand addresses in a new operand list, preferably in descending order. A duplicate operand remover 1216 is used to delete any duplicate operands from the operand list, and to remove the corresponding columns in the truth table. A truth table orientation mechanism 1218 may be used to perform manipulations on truth tables to represent the expression in different, equivalent ways. A non-significant operand remover 1220 is used to delete any non-significant columns from a truth table and to remove the corresponding operands from the operand list.

Database query optimizer 1200 also includes an expression comparison mechanism 1230 that may be used to compare two expressions. Database query optimizer 1210 further includes an expression constructor/retrieval mechanism 1240 that processes an expression. Expression constructor/retrieval mechanism 1240 includes a trivial expression detector 1250 that allows simplifying a predicate expression when it contains a single relational, unary, or boolean expression, and an expression negation mechanism 1260 that allows for easily negating a predicate expression. Negation of an expression is done by copying the operand list for the expression, then creating a corresponding list of binary characters that contains the complement of the binary characters stored for the expression. Note that the database query optimizer 1200 preferably performs the steps in method 600 shown in FIG. 6.

Figure 14:
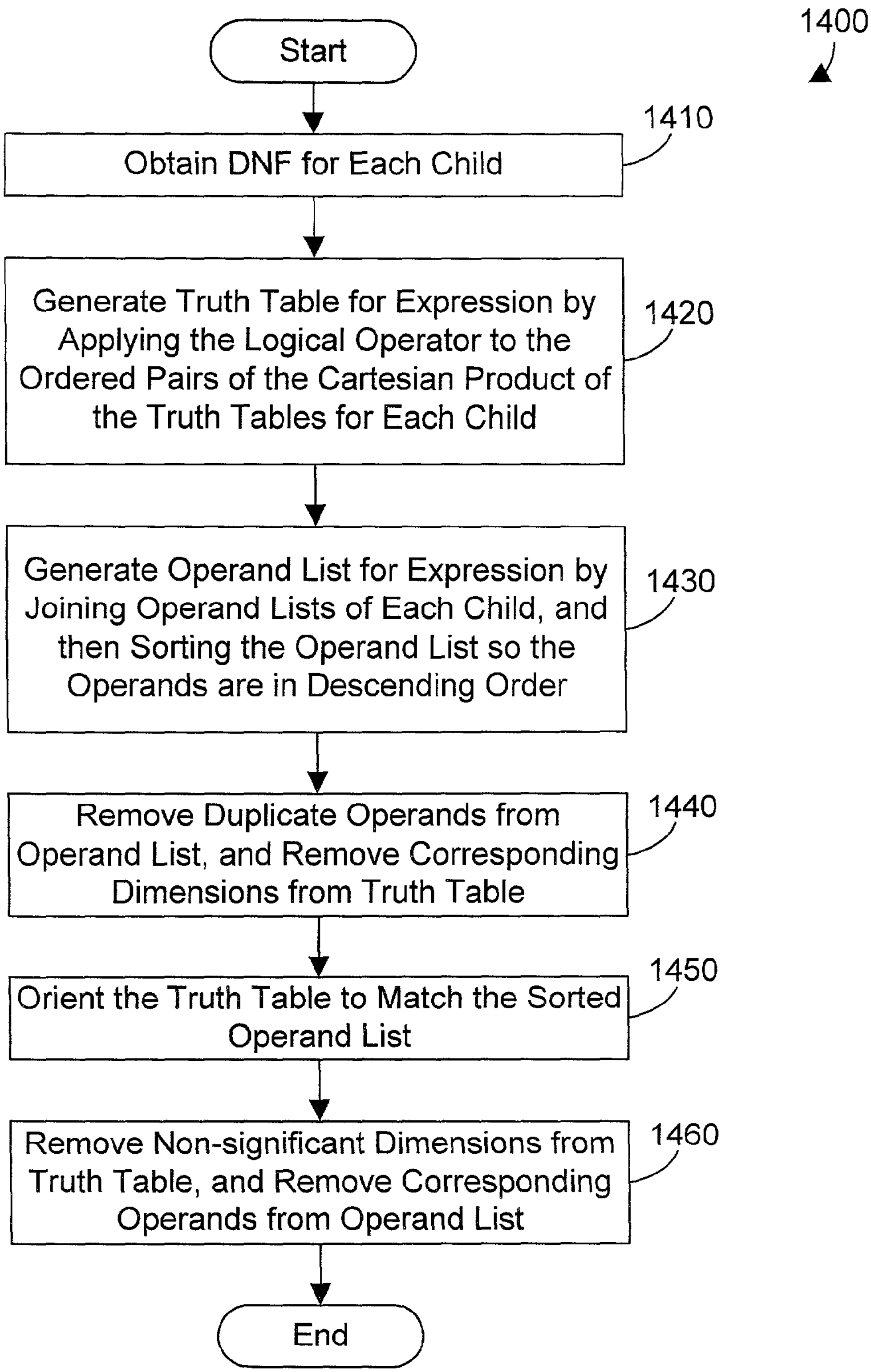
FIG. 14 is a flow diagram of a method for manipulating the truth tables of expressions to evaluate more complex expressions according to the preferred embodiments.

The database query optimizer 1200 preferably performs the steps in method 1400 in FIG. 14 when an expression is processed that includes terms (i.e., children) that have been previously-processed, and their resulting operand list and corresponding list of binary characters have been stored for later use. Method 1400 assumes that an expression needs to be evaluated that includes only children that have been previously processed. First, the disjunct normal for each child (i.e., term) in the expression is obtained (step 1410). The disjunct normal form is the stored operand list and corresponding truth tables that may be obtained by reading them from storage. A truth table for the expression may then be generated by applying a logical operator to the ordered pairs of the Cartesian product of the truth tables for each child (step 1420). An operand list is then generated for the expression by joining the operand lists of each child, and then sorting the resulting operand list so the operands are in descending order (step 1430). Duplicate operands are then removed from the operand list, and the dimensions corresponding to the removed operands are removed from the truth table (step 1440). The truth table is then oriented to match the sorted operand list (step 1450). Any non-significant dimensions may then be removed from the truth table, and the corresponding operands in the operand list are also removed (step 1460). Method 1400 thus shows how to process the operand list and truth table of stored expressions to more quickly generate an operand list and truth table for the expression being processed. Note that the expression constructor/retrieval mechanism 1280 in FIG. 12 preferably performs steps 1410, 1420, and the first part of step 1430 in FIG. 14. The operand generator/sorter 1214 in FIG. 12 is used to sort the operand list shown in the last part of step 1430. The duplicate operands are removed in step 1440 by duplicate operand remover 1216. The truth table is oriented in step 1450 using the truth table orientation mechanism 1218. And the non-significant dimensions are removed from the truth table and operand list in step 1460 by the non-significant operand remover 1220.

Figure 15:
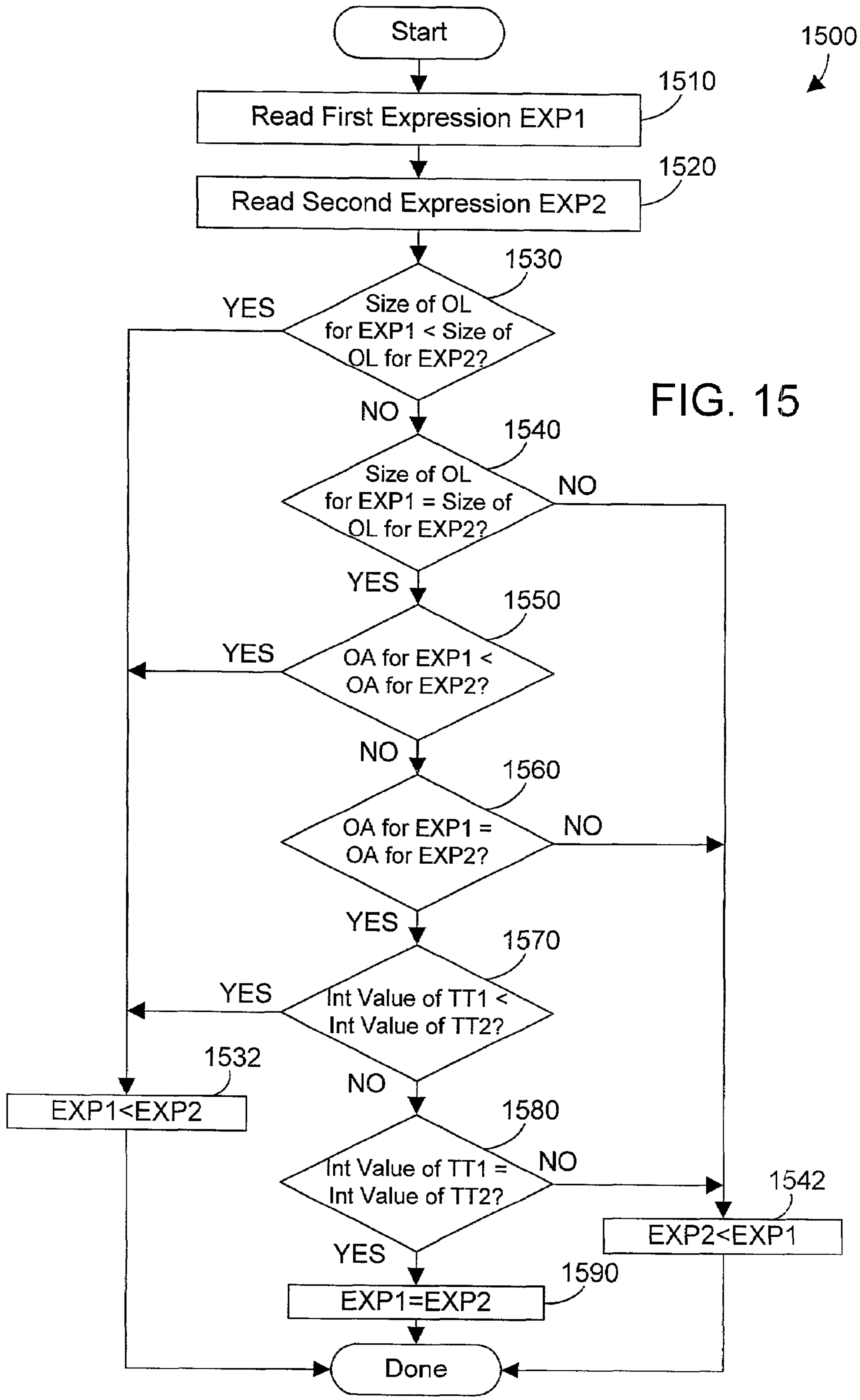
FIG. 15 is a flow diagram of a method for comparing expressions using their corresponding operand lists and truth tables according to the preferred embodiments.

The database query optimizer 1200 of FIG. 12 also includes an expression comparison mechanism 1230 that allows comparing two expressions by comparing attributes of their operand lists and truth tables, as shown by method 1500 of FIG. 15. A first expression denoted EXP1 is read (step 1510). A second expression denoted EXP2 is read (step 1520). If the size of the operand list (denoted OL in FIG. 15) for EXP1 is smaller than the size of the operand list for EXP2 (step 1530=YES), then EXP1 is less than EXP2 (step 1532). If the size of the operand list for EXP1 is not less than the size of the operand list for EXP2 (step 1530=NO), method 1500 next checks to see if the size of the operand lists for EXP1 and EXP2 are equal (step 1540). If not (step 1540=NO), then EXP2 is less than EXP1 (step 1542). If the size of the operand list for EXP1 is greater than the size of the operand list for EXP2 (step 1540=YES), method 1500 then compares the address of the operands, referred to in FIG. 15 as the operand address OA. If the operand address for EXP1 is less than the operand address for EXP2 (step 1550=YES), EXP1 is less than EXP2 (step 1532). If the operand address for EXP1 is greater than the operand address for EXP2 (step 1550=NO and step 1560=NO), EXP2 is less than EXP1 (step 1542). If the operand address for EXP1 is equal to the operand address for EXP2 (step 1560=YES), method 1500 has determined that the operand lists are identical, and we must now look to the truth table to see if any differences exist. If the integer value of the bits in the truth table for EXP1 (i.e., TT1) is less than the integer value of the bits in the truth table for EXP2 (i.e., TT2) (step 1570=YES), EXP1 is less than EXP2 (step 1532). Otherwise (step 1570=NO), if the integer value of the bits in TT1 equals the integer value of the bits in TT2 (step 1580=YES), EXP1 equals EXP2 (step 1590). If the integer value of TT1 is greater than the integer value of TT2 (step 1580=NO), EXP2 is less than EXP1 (step 1542). Method 1500 thus shows a method that allows comparing the operand lists and truth tables for stored expressions to determine whether a stored operand list and truth table already exists for an expression being currently processed.

Several examples are now presented that illustrate how data stored in an operand list and corresponding truth table may be used to process an expression in accordance with the preferred embodiments. We start with the logical expression in FIG. 16, namely (C1=5 OR C2>6) AND C3=7. We first want to evaluate the (C1=5 OR C2>6) term. A truth table in FIG. 17 shows the appropriate values when C1=5 corresponds to the A dimension and C2>6 corresponds to the B dimension. Similarly, the truth table of FIG. 18 may be constructed for the C3=7 term in the logical expression of FIG. 16. Identifiers are then assigned to the truth table entries, as shown in FIG. 19. We now take the cross product of AB and C, which results in the tuples shown in FIG. 20. After applying the AND operator to the tuples (which is the operator joining the two terms in the logical expression of FIG. 16), the result is the values shown in the After AND column in FIG. 21. Note that this result of taking the cross product of the truth tables (in the form of the lists of binary characters) and applying the AND operator is equivalent to the truth table in FIG. 22, which shows the results of the logical expression (A OR B) AND C. This example illustrates that the lists of binary characters for logical expressions may be manipulated mathematically to determine the resulting list of binary characters for a combined logical expression.

Figures 23, 24, 25:
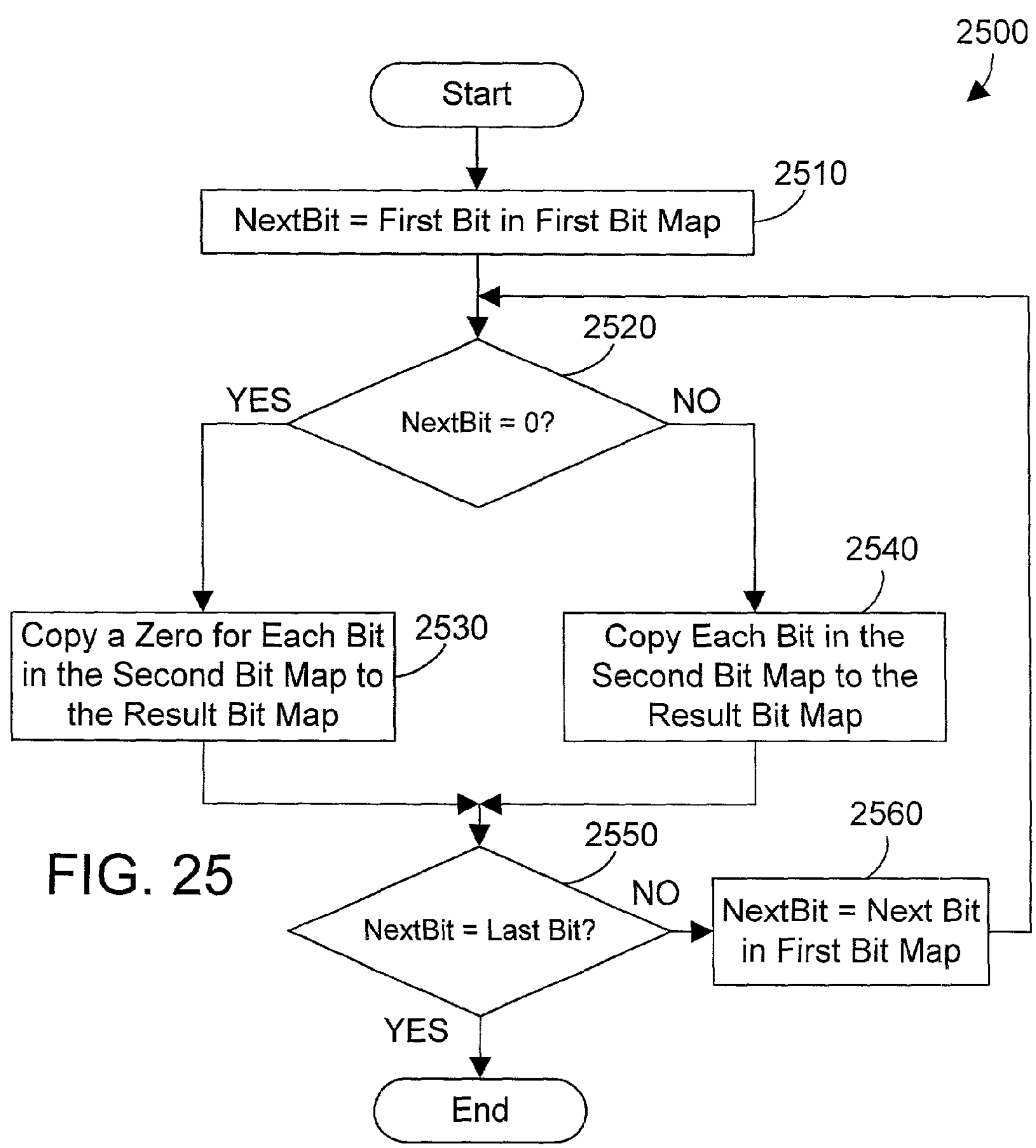
FIG. 23 shows two sample bit maps that represent truth tables for operands AB and CD.
FIG. 24 shows the cross product of AB and CD using the AND operator.
FIG. 25 is a flow diagram of a method for performing the cross product shown in FIG. 24.

We now show another example of how the list of binary characters that represent truth tables for expressions may be manipulated mathematically to arrive at a list of binary characters that represents a combined expression. We assume for this example that an expression AB has a list of binary characters 1,1,1,0, and that an expression CD has a list of binary characters 1,0,0,0, as shown in FIG. 23. We now assume that we want to process the expression AB AND CD. We can do this by first taking the cross product of the binary characters for AB (1,1,1,0) and the binary characters for CD (1,0,0,0). This is shown in expanded form in FIG. 24. The bits in the list of binary characters for AB are ANDed with CD.

For the sake of convenience in describing method 2500 of FIG. 25, we refer to a list of binary characters for an expression as a "bit map". Method 2500 is a method for deriving a resulting bit map from the cross product of a first and second bit map. Method 2500 begins by selecting the first bit in the first bit map (step 2510). If the value of this selected bit is zero (step 2520=YES), we copy a zero for each bit in the second bit map into the result bit map (step 2530). If the bit is a one, we copy each bit in the second bit map to the result bit map (step 2540). If there are more bits in the first bit map to process (step 2550=NO), the next bit in the first bit map is selected (step 2560), and the process is repeated until all bits in the first bit map have been selected (step 2550=YES).

If we apply method 2500 of FIG. 25 to the first bit map AB {1,1,1,0} and to the second bit map CD {1,0,0,0} as shown in FIG. 23, the result is shown in FIG. 26, with the final bit map shown in FIG. 27. This example shows how easy it is to compute a logical expression AB AND CD using their list of binary characters (i.e., bit maps) without even knowing what the individual expressions AB and CD represent.

Figures 29, 30, 31:
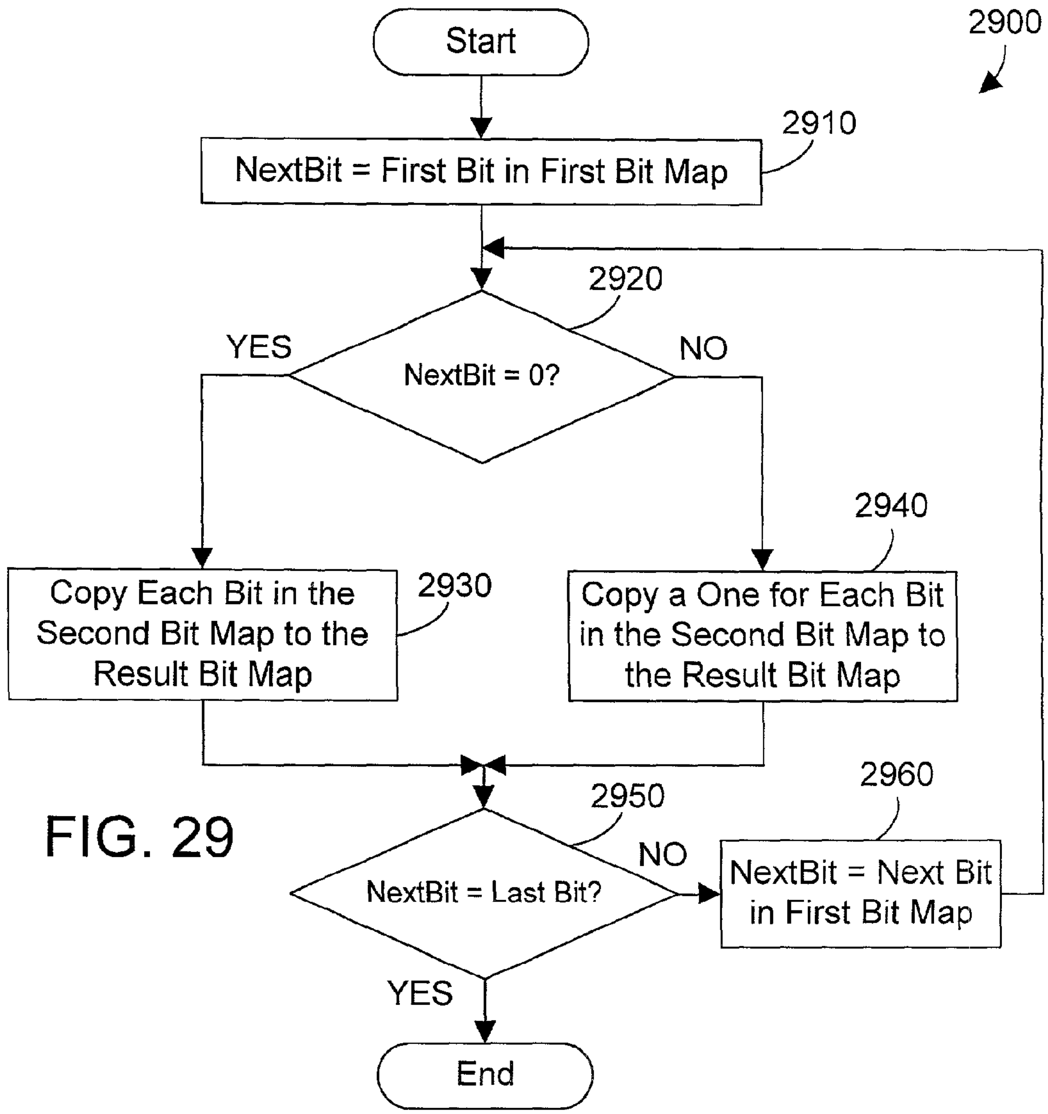
FIG. 29 is a flow diagram of a method for performing the cross product shown in FIG. 28.
FIG. 30 represents the results of applying the method of FIG. 29 to the cross product in FIG. 28.
FIG. 31 is a bit map that represents the results shown in FIG. 30.

Now we assume we want to evaluate the expression AB OR CD using the same bit maps for AB and CD shown in FIG. 23. The expression AB OR CD can be computed using the cross product with the OR operator, as shown in FIG. 28. Method 2900 of FIG. 29 shows how the cross product of a first and second bit map may generate a result bit map for the OR operator. The first bit in the first bit map is selected (step 2910). If the value of the selected bit is zero (step 2920=YES), each bit in the second bit map is copied to the result bit map (step 2930). If the value of the selected bit is one (step 2920=NO), a one is copied for each bit in the second bit map to the result bit map (step 2940). If there are more bits in the first bit map to process (step 2950=NO), the next bit in the first bit map is selected (step 2960), and the process is repeated until all bits in the first bit map have been selected (step 2950=YES).

Applying method 2900 of FIG. 29 to the first bit map AB {1,1,1,0} and to the second bit map CD {1,0,0,0} as shown in FIG. 23, the result is shown in FIG. 30, with the final bit map shown in FIG. 31. This example shows how easy it is to compute a logical expression AB OR CD using their list of binary characters (i.e., bit maps) without even knowing what the individual expressions AB and CD represent.

FIGS. 32 and 33 show how a truth table may be manipulated by the truth table orientation mechanism 1218 of FIG. 12. The values of the truth table are, by definition, dependent on the ordering of the operands represented in the truth table. We take one sample truth table 3200 in FIG. 32 that has operands A, B and C listed from most significant to least significant, with the resulting values in the T column. Note that this truth table 3200 may be "rotated" by moving any of the dimensions. For the specific example of FIG. 32, the truth table 3200 is rotated to produce truth table 3210 by making B the most significant dimension in the truth table, making C the next significant dimension, and making A the least significant dimension. With this rotation of the truth table, the entry 3220 in truth table 3200 is the same entry as entry 3230 in truth table 3210. This rotation example shows clearly that the ordering of operands in the operand list dictates the values in the corresponding bit map. Thus, we see in FIG. 33 that the bit map for the operand list ABC is {1,0,1,0,1,0,0,0}, while the bit map for the operand list BCA is {1,1,0,0,1,0,0,0}. Note that these are different ways to represent the same expression. For this reason, the operand generator/sorter 1214 of FIG. 12 is used to put all stored expressions in similar format by placing the operands in an order that depends on the address of the operands, while the truth table orientation mechanism 1218 rotates the truth table as required to correspond to the ordering of operands in the operand list.

We now present an example to show how duplicate operands may be removed in accordance with the preferred embodiments (preferably by duplicate operand remover 1216 of FIG. 12). An expression is shown in FIG. 34. While a human can visually discern that the term C1=5 in FIG. 34 is a duplicate term, this simple example will illustrate how the preferred embodiments may determine whether any term, including a complex logical expression, is a duplicate term in a larger, combined expression. We assume that dimension A is assigned to C1=5, and dimension B is assigned to C2>6. The resulting truth tables for the expression C1=5 OR C2>6 is shown as truth table 3500 in FIG. 35, while the resulting truth table for the expression C1=5 is shown as truth table 3510 in FIG. 35. The bit maps corresponding to the truth tables 3500 and 3510 in FIG. 35 are shown in FIG. 36. If we take the resulting cross product of the bit maps of FIG. 36 using the OR operator, as discussed above with reference to FIGS. 28–31, the resulting truth table 3700 is shown in FIG. 37. Note, however, that the resulting truth table 3700 contains absurd entries because A and its complement ~A are present at the same time. The absurd cases may be removed from the truth table 3700, resulting in truth table 3800 of FIG. 38. Note that the A dimension is represented twice in the operand list corresponding to truth table 3800, and need not be. As a result, the second A dimension may be removed, resulting in the truth table 3900 of FIG. 39. We thus see that the bit map {1,1,1,0} for operand list AB represents the logical expression (C1=5 OR C2>6) OR C1=5. Of course, the removal of duplicate operands becomes more important as the number of dimensions increases and the complexity of the expressions being evaluated increases. The point illustrated by this simple example in FIGS. 34–40 is that the preferred embodiments are capable of detecting duplicate operands in an expression and may remove the duplicate operands to reduce the expression to its simplest disjunct normal form.

An example is now presented that shows how the preferred embodiments may remove non-significant operands (preferably by non-significant operand remover 1220 of FIG. 12). A logical expression is shown in FIG. 41. We assume that dimension A is assigned to C1=5, and dimension B is assigned to C2>6. The resulting truth tables for the expression C1=5 OR C2>6 are shown as truth table 4200 in FIG. 42, while the resulting truth table for the expression C1=5 is shown as truth table 4210 in FIG. 42. Because these truth tables are identical to the truth tables 3500 and 3510 in FIG. 35, the resulting bit maps are the same, as shown in FIG. 36. If we take the resulting cross product of these bit maps in FIG. 36 using the AND operator, as discussed above with reference to FIGS. 23–27, the resulting truth table 4300 is shown in FIG. 43. Again, the resulting truth table 4300 contains absurd entries because A and its complement ~A are present at the same time. The absurd cases may be removed from the truth table 4300, resulting in truth table 4400 of FIG. 44. As shown in the truth table 4500 of FIG. 45, we note that the value of B does not matter, and B is thus a non-significant operand. As a result, operand B may be removed from the truth table 4500, resulting in the truth table 4600 of FIG. 46, with the corresponding bit map shown in FIG. 47. We thus see that the bit map {1,0} for operand list A represents the logical expression (C1=5 OR C2>6) AND C1=5. Of course, the removal of non-significant operands becomes more important as the number of dimensions increases and the complexity of the expressions being evaluated increases. The point illustrated by this simple example in FIGS. 41–47 is that the preferred embodiments are capable of detecting non-significant operands in an expression and may remove the non-significant operands to reduce the resulting expression to its simplest disjunct normal form.

Figures 48, 49:
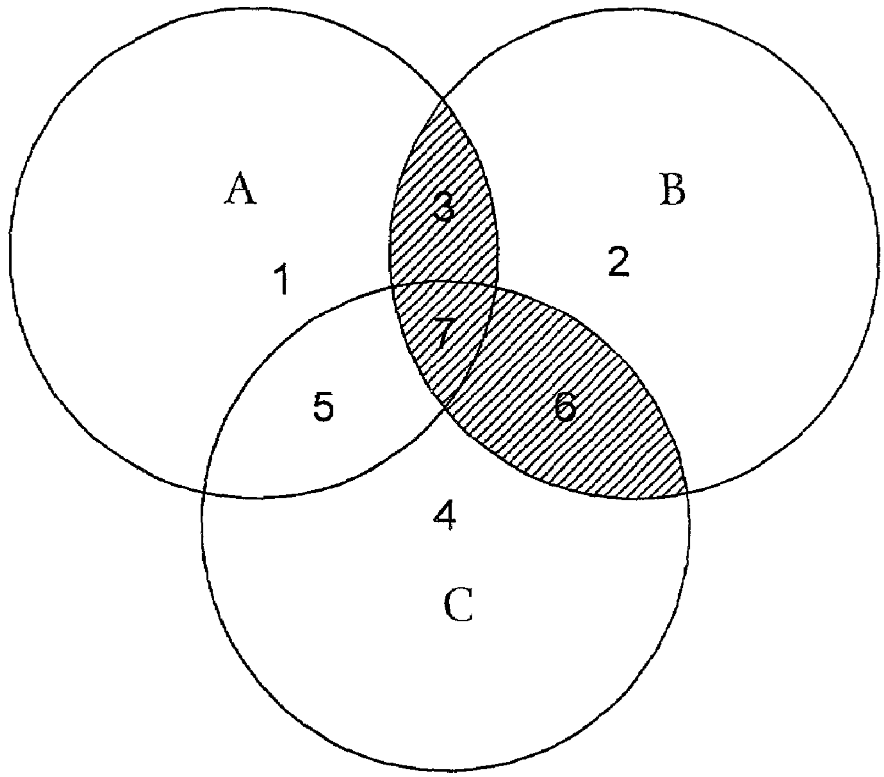
FIG. 48 is a Venn diagram with numbers assigned to different regions.
FIG. 49 is a truth table with corresponding regions that corresponds to regions in the Venn diagram of FIG. 48.

The Venn diagram of FIG. 48 and the corresponding truth table in FIG. 49 illustrate how the bit map that represents a truth table is also useful in representing logical intersections and unions in a Venn diagram. Referring to FIG. 48, three circles A, B and C have intersecting portions. Circle A has regions 3 and 7 that intersect with circle B. Circle B has regions 6 and 7 that intersect with circle C. Circle C has regions 5 and 7 that intersect with circle A. Region 1 in circle A represents the portion of circle A that does not intersect any other circle. Similarly, region 2 in circle B represents the portion of circle B that does not intersect any other circle, and region 4 in circle C represents the portion of circle C that does not intersect any other circle. With the regions assigned their respective numbers in FIG. 48, we now find that the region numbers correspond to the binary values of dimensions (or operands) in the corresponding truth table in FIG. 49. Thus, region 1 is represented by the expression ~C AND ~B AND A. This is visually verified in inspecting the Venn diagram of FIG. 48, that region 1 corresponds to those portions of A that are not in B or C. Each region in FIG. 48 corresponds to the binary value in the truth table. Thus, region 7 corresponds to the binary value 1,1,1, which corresponds to the logical expression C AND B AND A, which visually corresponds to region 7 in FIG. 48 that is common to all three circles. This example shows that the ordering of operands in the operand list and the ordering of bits in the corresponding bit map allows the mining of relationships stored implicitly due to the relative position of the ordered bits in the bit map, rather than storing these relationships explicitly in additional data structures, as would be required by the prior art. The preferred embodiments thus promote more efficient use of memory resources by implicitly containing relationships due to the ordering of bits in a bit map, rather than storing these relationships explicitly using additional memory resources.

Figure 50:
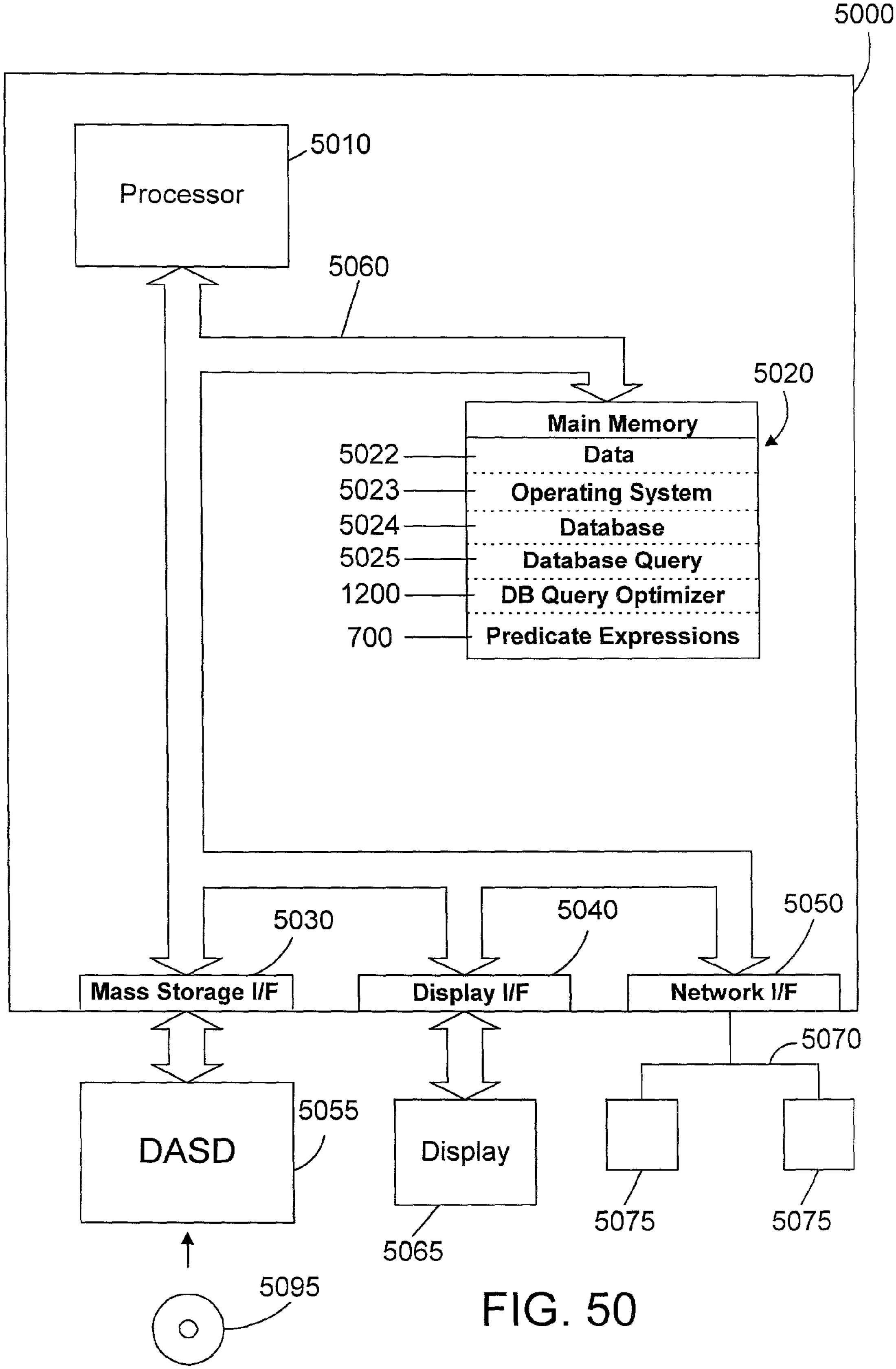
FIG. 50 is an apparatus in accordance with the preferred embodiments.

Referring now to FIG. 50, a computer system 5000 is one suitable implementation of an apparatus in accordance with the preferred embodiments of the invention. Computer system 5000 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 50, computer system 5000 comprises a processor 5010, a main memory 5020, a mass storage interface 5030, a display interface 5040, and a network interface 5050. These system components are interconnected through the use of a system bus 5060. Mass storage interface 5030 is used to connect mass storage devices (such as a direct access storage device 5055) to computer system 5000. One specific type of direct access storage device 5055 is a readable and writable CD ROM drive, which may store data to and read data from a CD ROM 5095.

Main memory 5020 in accordance with the preferred embodiments contains data 5022, an operating system 5023, a database 5024, one or more database queries 5025, a database query optimizer 1200, and one or more predicate expressions 700. Note that the predicate expressions 700 and the database query optimizer 1200 are described in detail above with reference to FIGS. 7 and 12, respectively.

Computer system 5000 utilizes well known virtual addressing mechanisms that allow the programs of computer system 5000 to behave as if they only have access to a large, single storage entity instead of access to multiple, smaller storage entities such as main memory 5020 and DASD device 5055. Therefore, while data 5022, operating system 5023, database 5024, database query 5025, database query optimizer 1200., and predicate expressions 700 are shown to reside in main memory 5020, those skilled in the art will recognize that these items are not necessarily all completely contained in main memory 5020 at the same time. It should also be noted that the term "memory" is used herein to generically refer to the entire virtual memory of computer system 5000, and may include the virtual memory of other computer systems coupled to computer system 5000.

Data 5022 represents any data that serves as input to or output from any program in computer system 5000. Operating system 5023 is a multitasking operating system known in the industry as OS/400; however, those skilled in the art will appreciate that the spirit and scope of the present invention is not limited to any one operating system. Database 5024 is any suitable database, whether currently known or developed in the future. Database query 5025 is a query in a format compatible with the database 5024 that allows information stored in the database 5024 that satisfies the database query 5025 to be retrieved. Database query optimizer 1200 processes one or more expressions in database query 5025. Once database query optimizer 1200 processes an expression, the result of the expression is stored as a predicate expression 700 in main memory 5020. This allows the stored predicate expression 700 to be used later in evaluating other, more complex logical expressions that may contain simplified pieces that correspond to previously-processed predicate expressions.

Processor 5010 may be constructed from one or more microprocessors and/or integrated circuits. Processor 5010 executes program instructions stored in main memory 5020. Main memory 5020 stores programs and data that processor 5010 may access. When computer system 5000 starts up, processor 5010 initially executes the program instructions that make up operating system 5023. Operating system 5023 is a sophisticated program that manages the resources of computer system 5000. Some of these resources are processor 5010, main memory 5020, mass storage interface 5030, display interface 5040, network interface 5050, and system bus 5060.

Although computer system 5000 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 5010. However, those skilled in the art will appreciate that the present invention applies equally to computer systems that simply use I/O adapters to perform similar functions.

Display interface 5040 is used to directly connect one or more displays 5065 to computer system 5000. These displays 5065, which maybe non-intelligent (i.e., dumb) terminals or fully programmable workstations, are used to allow system administrators and users to communicate with computer system 5000. Note, however, that while display interface 5040 is provided to support communication with one or more displays 5065, computer system 5000 does not necessarily require a display 5065, because all needed interaction with users and other processes may occur via network interface 5050.

Network interface 5050 is used to connect other computer systems and/or workstations (e.g., 5075 in FIG. 50) to computer system 5000 across a network 5070. The present invention applies equally no matter how computer system 5000 may be connected to other computer systems and/or workstations, regardless of whether the network connection 5070 is made using present-day analog and/or digital techniques or via some networking mechanism of the future. In addition, many different network protocols can be used to implement a network. These protocols are specialized computer programs that allow computers to communicate across network 5070. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 5095 of FIG. 50), and transmission type media such as digital and analog communications links.

The preferred embodiments described herein process a predicate expression in a database query, and store an operand list and corresponding list of binary characters that represent the expression. When the expression is encountered later, the previously-stored operand list and list of binary characters may be retrieved from storage, rather than repeating the effort of generating the operand list and corresponding list of binary characters for each expression. The list of binary characters allows expressions to be easily manipulated by performing cross products on the list of binary characters for different expressions to generate an operand list and corresponding truth table for a more complex expression. In addition, the complement of an expression may be easily generated by copying the operand list and inverting the bits in the stored list of binary characters corresponding to the expression. If neither the expression nor its complement exist in memory, an operand list and corresponding list of binary characters are generated, stored in memory for later use, and returned. In this manner the database query optimizer of the preferred embodiments continually builds upon work previously performed by retrieving the operand list and truth tables for previously-processed expressions, rather than building each expression in a database query from scratch.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:

at least one processor;

a memory coupled to the at least one processor; and an optimizer residing in the memory and executed by the at least one processor, the optimizer analyzing an expression and generating from the expression a list of operands and a corresponding list of binary characters representative of a truth table that includes at least two rows and at least one column, each column corresponding to an operand in the list of operands, the list of operands and corresponding truth table representing a disjunct normal form for the experssion; and wherein the optimizer analyzes a plurality of expressions by computing a cross product of the lists of binary characters corresponding to the plurality of expressions to generate a list of binary characters corresponding to a new truth table.

2. The apparatus of claim 1 further comprising a database residing in the memory, wherein the expression is a portion of a query to the database.

3. The apparatus of claim 1 wherein the number of binary characters in the list of binary characters is equal to the number of rows in the truth table, wherein for N operands in the list of operands, the number of binary characters in the list of binary characters is $2^N$.

4. The apparatus of claim 1 wherein the order of rows in the truth table corresponds to the order of binary characters in the list of binary characters.

5. The apparatus of claim 1 wherein the optimizer removes any non-significant columns in the new truth table and removes any corresponding operands in the corresponding operand list.

6. The apparatus of claim 1 wherein the optimizer removes any duplicate columns in the new truth table and removes any corresponding operands in the corresponding operand list.

7. The apparatus of claim 1 wherein the optimizer determines whether the expression corresponds to a relational expression, a unary expression, or a boolean expression, and if so, returns the corresponding expression.

8. The apparatus of claim 7 wherein, if the expression does not correspond to a relational expression, a unary expression, or a boolean expression, the optimizer further determines whether the expression has a corresponding stored expression, and if so, the optimizer retrieves and returns the corresponding stored expression.

9. The apparatus of claim 8 wherein, if the expression has no corresponding stored expression, the optimizer determines whether the expression has a corresponding stored complement expression, and if so, generates from the stored complement expression a new stored expression corresponding to the expression, and returns the new stored expression.

10. The apparatus of claim 9 wherein the optimizer generates from the stored complement expression a new stored expression corresponding to the expression by inverting each bit in the list of binary characters corresponding to the stored complement expression.

11. The apparatus of claim 9 wherein, if the expression has no corresponding stored expression and has no corresponding stored complement expression, the optimizer generates a new corresponding expression, stores the new corresponding expression, and returns the new corresponding expression.

12. The apparatus of claim 1 wherein the optimizer compares the expression to a second expression.

13. The apparatus of claim 1 wherein the optimizer changes the orientation of the truth table by changing the order of columns and by changing the order of corresponding operands in the operand list.

14. An apparatus comprising:

at least one processor;

a memory coupled to the at least one processor;

a database residing in the memory;

a database query optimizer residing in the memory and executed by the at least one processor, the database query optimizer processing a predicate expression in a query to the database, the database query optimizer comprising:

a disjunct normal form generator mechanism that generates from the predicate expression a list of operands and a corresponding list of binary characters representative of a truth table that includes at least two rows and at least one column, each column corresponding to an operand in the list of operands, the list of operands and corresponding truth table representing a disjunct normal form for the predicate expression, wherein the number of binary characters in the list of binary characters is equal to the number of rows in the truth table, wherein for N operands in the list of operands, the number of binary characters in the list of binary characters is $2^N$, and wherein the order of rows in the truth table corresponds to the order of binary characters in the list of binary characters,;

an expression evaluator that analyzes a plurality of predicate expressions by computing a cross product of the lists of binary characters corresponding to the plurality of predicate expressions to generate a list of binary characters corresponding to a new truth table;

a non-significant operand remover that removes any non-significant columns in the new truth table and that removes any corresponding operands in the corresponding operand list;

a duplicate operand remover that removes any duplicate columns in the new truth table and that removes any corresponding operands in the corresponding operand list;

a trivial expression detector that determines whether the predicate expression corresponds to a relational expression, a unary expression, or a boolean expression, and if so, returns the corresponding expression;

an expression comparison mechanism that compares the predicate expression to a second predicate expression;

a truth table orientation mechanism that changes the orientation of the truth table by changing the order of columns and by changing the order of corresponding operands in the operand list;

an expression constructor/retrieval mechanism that determines from the trivial expression detector whether the predicate expression corresponds to a relational expression, a unary expression, or a unary expression, and if not, the expression constructor/retrieval mechanism further determines whether the predicate expression has a corresponding stored expression, and if so, the expression constructor/retrieval mechanism retrieves and returns the corresponding stored expression, and if the predicate expression has no corresponding stored expression, the expression constructor/retrieval mechanism determines whether the predicate expression has a corresponding stored complement expression, and if so, generates from the stored complement expression a new stored expression corresponding to the predicate expression, and returns the new stored expression, and if the predicate expression has no corresponding stored expression and no stored complement expression, the expression constructor/retrieval mechanism generates a new corresponding expression, stores the new corresponding expression, and returns the new corresponding expression.

15. A method for evaluating an expression comprising the steps of:

generating a list of operands, each operand corresponding to a relational expression, a unary expression, or a boolean expression in the expression;

generating a list of binary characters corresponding to the list of operands, the list of binary characters representing a truth table that includes at least two rows and at least one column, each column corresponding to an operand in the list of operands, the list of operands and corresponding truth table representing a disjunct normal form for the expression; and analyzing a plurality of expressions by computing a cross product of the lists of binary characters corresponding to the plurality of expressions to generate a list of binary characters corresponding to a new truth table.

16. The method of claim 15 wherein the number of binary characters in the list of binary characters is equal to the number of rows in the truth table, wherein for N operands in the list of operands, the number of binary characters in the list of binary characters is $2^N$.

17. The method of claim 15 wherein the order of rows in the truth table corresponds to the order of binary characters in the list of binary characters.

18. The method of claim 15 further comprising the steps of:

removing any non-significant columns in the new truth table; and removing any corresponding operands in the corresponding operand list.

19. The method of claim 15 further comprising the steps of:

removing any duplicate columns in the new truth table; and removing any corresponding operands in the corresponding operand list.

20. The method of claim 15 further comprising the steps of:

determining whether the expression corresponds to a relational expression, a unary expression, or a boolean expression; and if so, returning the corresponding expression.

21. The method of claim 20 further comprising the steps of:

if the expression does not correspond to a relational expression, a unary expression, or a boolean expression, determining whether the expression has a corresponding stored expression; and if so, retrieving and returning the corresponding stored expression.

22. The method of claim 21 further comprising the steps of:

if the expression has no corresponding stored expression, determining whether the expression has a corresponding stored complement expression, and if so, performing the steps of:

generating from the stored complement expression a new stored expression corresponding to the expression;

storing the new stored expression; and returning the new stored expression.

23. The method of claim 22 wherein the step of generating from the stored complement expression a new stored expression corresponding to the expression comprises the step of inverting each bit in the list of binary characters corresponding to the stored complement expression.

24. The method of claim 22 further comprising the steps of:

if the expression has no corresponding stored expression and no corresponding stored complement expression, performing the steps of:

generating a new corresponding expression;

storing the new corresponding expression; and returning the new corresponding expression.

25. The method of claim 15 further comprising the step of comparing the expression to a second expression.

26. The method of claim 15 further comprising the step of changing the orientation of the truth table by changing the order of columns and by changing the order of corresponding operands in the operand list.

27. A method for evaluating a plurality of expressions comprising the steps of:

(A) for each expression, performing the steps of:

(A1) generating a list of operands, each operand corresponding to a relational expression, a unary expression, or a boolean expression in the expression;

(A2) generating a list of binary characters corresponding to the list of operands, the list of binary characters representing a truth table that includes at least two rows and at least one column, each column corresponding to an operand in the list of operands, the list of operands and corresponding truth table representing a disjunct normal form for the expression, wherein the number of binary characters in the list of binary characters is equal to the number of rows in the truth table, wherein for N operands in the list of operands, the number of binary characters in the list of binary characters is $2^N$, and wherein the order of rows in the truth table corresponds to the order of binary characters in the list of binary characters; and (B) computing a cross product of the lists of binary characters corresponding to the plurality of expressions to generate a list of binary characters corresponding to a new truth table.

28. The method of claim 27 further comprising the steps of:

removing any non-significant columns in the new truth table; and removing any corresponding operands in the corresponding operand list.

29. The method of claim 27 further comprising the steps of:

removing any duplicate columns in the new truth table; and removing any corresponding operands in the corresponding operand list.

30. The method of claim 27 further comprising the steps of:

determining whether the expression corresponds to a relational expression, a unary expression, or a boolean expression; and if so, returning the corresponding expression.

31. The method of claim 30 further comprising the steps of:

if the expression does not correspond to a relational expression, a unary expression, or a boolean expression, determining whether the expression has a corresponding stored expression; and if so, retrieving and returning the corresponding stored expression.

32. The method of claim 31 further comprising the steps of:

if the expression has no corresponding stored expression, determining whether the expression has a corresponding stored complement expression, and if so, performing the steps of:

generating from the stored complement expression a new stored expression corresponding to the expression;

storing the new stored expression; and returning the new stored expression.

33. The method of claim 32 wherein the step of generating from the stored complement expression a new stored expression corresponding to the expression comprises the step of inverting each bit in the list of binary characters corresponding to the stored complement expression.

34. The method of claim 32 further comprising the steps of:

if the expression has no corresponding stored expression and no corresponding stored complement expression, performing the steps of:

generating a new corresponding expression;

storing the new corresponding expression; and returning the new corresponding expression.

35. The method of claim 27 further comprising the step of comparing the expression to a second expression.

36. The method of claim 27 further comprising the step of changing the orientation of the truth table by changing the order of columns and by changing the order of corresponding operands in the operand list.

37. A program product comprising:

(A) an optimizer that analyzes an expression, generates a disjunct normal form for the expression, and generates from the disjunct normal form a list of operands and a corresponding list of binary characters representative of a truth table that includes at least two rows and at least one column, each column corresponding to an operand in the list of operands, the list of operands and corresponding truth table representing a disjunct normal form for the expression, and wherein the optimizer analyzes a plurality of expressions by computing a cross product of the lists of binary characters corresponding to the plurality of expressions to generate a list of binary characters corresponding to a new truth table; and (B) computer-readable signal bearing media bearing the optimizer.

38. The program product of claim 37 wherein the computer-readable signal bearing media comprises recordable media.

39. The program product of claim 37 wherein the computer-readable signal bearing media comprises transmission media.

40. The program product of claim 37 wherein the expression is a portion of a query to a database.

41. The program product of claim 37 wherein the number of binary characters in the list of binary characters is equal to the number of rows in the truth table, wherein for N operands in the list of operands, the number of binary characters in the list of binary characters is $2^N$.

42. The program product of claim 37 wherein the order of rows in the truth table corresponds to the order of binary characters in the list of binary characters.

43. The program product of claim 37 wherein the optimizer removes any non-significant columns in the new truth table and removes any corresponding operands in the corresponding operand list.

44. The program product of claim 37 wherein the optimizer removes any duplicate columns in the new truth table and removes any corresponding operands in the corresponding operand list.

45. The program product of claim 37 wherein the optimizer determines whether the expression corresponds to a relational expression, a unary expression, or a boolean expression, and if so, returns the corresponding expression.

46. The program product of claim 45 wherein, if the expression does not correspond to a relational expression, a unary expression, or a boolean expression, the optimizer further determines whether the expression has a corresponding stored expression, and if so, the optimizer retrieves and returns the corresponding stored expression.

47. The program product of claim 46 wherein, if the expression has no corresponding stored expression, the optimizer determines whether the expression has a corresponding stored complement expression, and if so, generates from the stored complement expression a new stored expression corresponding to the expression, and returns the new stored expression.

48. The program product of claim 47 wherein the optimizer generates from the stored complement expression a new stored expression corresponding to the expression by inverting each bit in the list of binary characters corresponding to the stored complement expression.

49. The program product of claim 47 wherein, if the expression has no corresponding stored expression and has no corresponding stored complement expression, the optimizer generates a new corresponding expression, stores the new corresponding expression, and returns the new corresponding expression.

50. The program product of claim 37 wherein the optimizer compares the expression to a second expression.

51. The program product of claim 37 wherein the optimizer changes the orientation of the truth table by changing the order of columns and by changing the order of corresponding operands in the operand list.

52. A program product comprising:

(A) a database query optimizer comprising:

a disjunct normal form generator mechanism that generates from a predicate expression in a database query a list of operands and a corresponding list of binary characters representative of a truth table that includes at least two rows and at least one column, each column corresponding to an operand in the list of operands, the list of operands and corresponding truth table representing a disjunct normal form for the predicate expression, wherein the number of binary characters in the list of binary characters is equal to the number of rows in the truth table, wherein for N operands in the list of operands, the number of binary characters in the list of binary characters is $2^N$, and wherein the order of rows in the truth table corresponds to the order of binary characters in the list of binary characters;

an expression evaluator that analyzes a plurality of predicate expressions by computing a cross product of the lists of binary characters corresponding to the plurality of predicate expressions to generate a list of binary characters corresponding to a new truth table;

a non-significant operand remover that removes any non-significant columns in the new truth table and that removes any corresponding operands in the corresponding operand list;

a duplicate operand remover that removes any duplicate columns in the new truth table and that removes any corresponding operands in the corresponding operand list;

a trivial expression detector that determines whether the predicate expression corresponds to a relational expression, a unary expression, or a boolean expression, and if so, returns the corresponding expression;

an expression comparison mechanism that compares the predicate expression to a second predicate expression;

a truth table orientation mechanism that changes the orientation of the truth table by changing the order of columns and by changing the order of corresponding operands in the operand list;

an expression constructor/retrieval mechanism that determines from the trivial expression detector whether the predicate expression corresponds to a relational expression, a unary expression, or a boolean expression, and if not, the expression constructor/retrieval mechanism further determines whether the predicate expression has a corresponding stored expression, and if so, the expression constructor/retrieval mechanism retrieves and returns the corresponding stored expression, and if the predicate expression has no corresponding stored expression, the expression constructor/retrieval mechanism determines whether the predicate expression has a corresponding stored complement expression, and if so, generates from the stored complement expression a new stored expression corresponding to the predicate expression, and returns the new stored expression, and if the predicate expression has no corresponding stored expression and no stored complement expression, the expression constructor/retrieval mechanism generates a new corresponding expression, stores the new corresponding expression, and returns the new corresponding expression; and (B) computer-readable signal bearing media bearing the database query optimizer.

53. The program product of claim 52 wherein the computer-readable signal bearing media comprises recordable media.

54. The program product of claim 52 wherein the computer-readable signal bearing media comprises transmission media.

* * * * *